No. 880,249. PATENTED FEB. 25, 1908.
H. SNODGRASS.
ELECTROMAGNETIC BRAKE.
APPLICATION FILED JUNE 1, 1907.
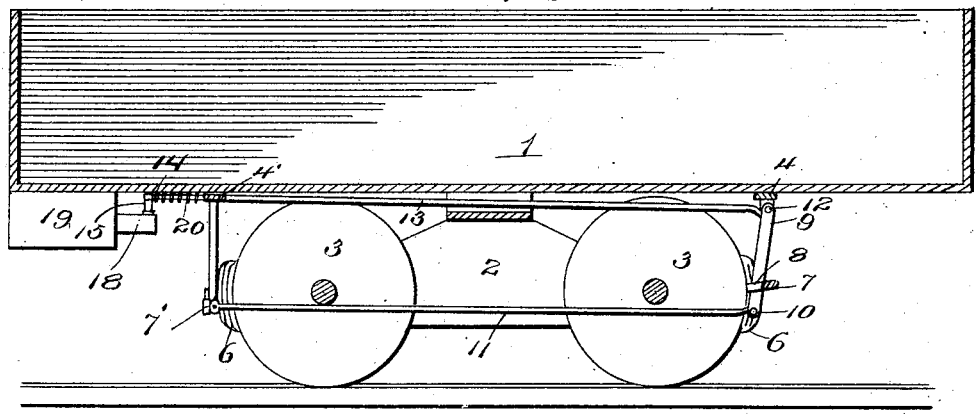
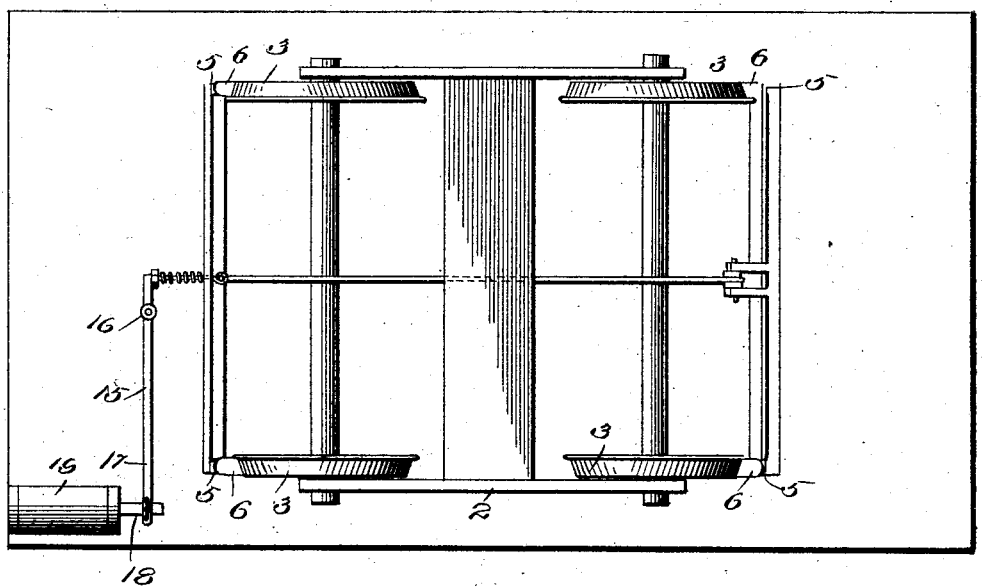

UNITED STATES PATENT OFFICE.

HIRAM SNODGRASS, OF OKLAHOMA, OKLAHOMA.

ELECTROMAGNETIC BRAKE.

No. 880,249.  Specification of Letters Patent.  Patented Feb. 25, 1908.

Application filed June 1, 1907. Serial No. 376,788.

*To all whom it may concern:*

Be it known that I, HIRAM SNODGRASS, a citizen of the United States, residing at Oklahoma city, in the county of Oklahoma and State of Oklahoma, have invented certain new and useful Improvements in Electromagnetic Brakes; and I do hereby declare the following to be a full, clear, and exact description of the invention, such as will enable others skilled in the art to which it appertains to make and use the same.

The present invention relates to improvements in electro-magnetic brakes designed more particularly for use on vehicles; but it especially relates to that class of brakes which are normally applied to the wheels and are set by the action of solenoids.

The object of this invention is to have a brake mechanism wherein a solenoid is caused to operate the entire braking mechanism of each car.

The invention also consists in these and other novel features of constructions and combinations which will be hereinafter fully described and claimed.

In the accompanying drawings:—Figure 1 is a bottom plan view of a car showing the braking mechanism applied thereto. Fig. 2 is a longitudinal cross section through a car showing the braking mechanism in detail.

In the drawing, 1 designates the car bottom which carries a truck frame 2 on which are mounted the wheels 3. Secured to the underside of the bottom 1 are beams 4, 4' carrying downwardly extending pivotally mounted arms or links 5 supporting suitable brake-shoes 6 and reinforced by beams 7 and 7'.

Fulcrumed on beam 7 in projections or ears 8 is a lever 9 having its lower end 10 connected to beam 7' by connecting rod 11. The other arm of lever 9 is connected at 12 to a rod 13 which extends longitudinally of the car and passes through beam 4' to an adjustable cap or nut 14. Mounted on the rod 13 between the face of beam 4' and the nut 14 is a spring 20 which is adapted to keep the shoes 6 in contact with the wheels 3 at all times, except when solenoid 19 is energized.

Bearing against the end of rod 13 is the short arm of a lever 15 which is fulcrumed at 16, having the extremity of its power arm 17 loosely attached to the core 18 of a solenoid 19. Any system of levers may be employed to actuate the rod 13 by means of solenoid 19 without departing from the spirit of the invention.

The operation of the device is as follows: The spring 20, by its tendency to expand, creates a pulling pressure on rod 13, which pressure is communicated through lever 9 to the brake beam 7' by means of rod 11. This pressure is simultaneously transmitted to the brake beam 7 by reason that the lever 9 is fulcrumed to the beam 7. Any number of brake-shoes, corresponding in number with the wheels, could be operated by being connected to rod 13.

When it is desired to set or release the brakes a current of electricity is passed through the solenoid 19, whence by a system of levers the rod 13 is caused to operate in a reverse direction, against the tension of the spring 20, and then the brake-shoes relax from their position in contact with the wheels and remain in that position during the whole time the current is passing through the solenoid.

Having thus described my invention what I claim and desire to secure by Letters Patent is:—

1. A braking mechanism, comprising a plurality of brake-beams, links secured to said beams, brake-shoes carried by said links, a lever carried by one of said brake-beams, means connecting one end of said lever to the other brake-beam, and a rod secured to opposite end of the lever and extending over to and through the beam, upon which is supported the opposite brake-beam, and a spring positioned between the beam and the end of the rod for normally acting upon the beams for applying the brake-shoes.

2. A braking mechanism, comprising a plurality of brake-beams, links secured to said beams, brake-shoes carried by said links, a lever carried by one of said brake-beams, means connecting one end of said lever to the other brake-beams, a rod secured to the opposite end of the lever and extending a predetermined distance beyond the same, a spring positioned between the brake beam and the end of the rod for normally acting upon the beams for applying the brake-shoes, and a solenoid in connection with a plurality of levers so positioned as to compress the spring and thereby release the braking mechanism.

3. A braking mechanism comprising a plurality of brake-beams links secured to said beams, brake-shoes carried by said links, a lever fulcrumed on one of said brake-beams, means connecting one end of said fulcrumed lever to the opposite brake-beam from that which supports said fulcrumed lever, and a rod pivoted to the opposite arm of said fulcrumed lever, said rod carrying at its extremity means for operating the same, by means of which the brakes are normally applied.

In testimony whereof I affix my signature in presence of two witnesses.

HIRAM SNODGRASS.

Witnesses:
JOHN L. FLETCHER,
A. T. KITCHIN.